(12) United States Patent
Haruki et al.

(10) Patent No.: US 10,069,297 B2
(45) Date of Patent: Sep. 4, 2018

(54) ELECTROSTATIC PROTECTION CIRCUIT

(71) Applicant: KABUSHIKI KAISHA TOSHIBA, Tokyo (JP)

(72) Inventors: Satoshi Haruki, Yokosuka Kanagawa (JP); Kazuhiro Kato, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 394 days.

(21) Appl. No.: 15/040,748

(22) Filed: Feb. 10, 2016

(65) Prior Publication Data

US 2016/0268798 A1 Sep. 15, 2016

(30) Foreign Application Priority Data

Mar. 9, 2015 (JP) ................. 2015-046362

(51) Int. Cl.
*H02H 9/02* (2006.01)
*H02H 9/04* (2006.01)
(52) U.S. Cl.
CPC .................. *H02H 9/046* (2013.01)
(58) Field of Classification Search
USPC ......................................................... 361/56
See application file for complete search history.

(56) References Cited

U.S. PATENT DOCUMENTS 5,311,391 A 5/1994 Dungan et al.
6,538,866 B1 3/2003 Hanzawa et al.
2006/0176626 A1* 8/2006 Greisbach et al. ...... H02H 9/00 361/56
2008/0239599 A1* 10/2008 Yizraeli et al. .......... H02H 9/00 361/56
2010/0118454 A1* 5/2010 Ker et al. ................. H02H 7/00 361/56
2011/0063764 A1* 3/2011 Barrow ..................... H02H 9/04 361/56
2012/0002333 A1* 1/2012 Soldner et al. .......... H02H 9/04 361/56

(Continued)

FOREIGN PATENT DOCUMENTS

JP H06334443 A 12/1994
JP 2000332207 A 11/2000

(Continued)

*Primary Examiner* — Ronald W Leja
(74) *Attorney, Agent, or Firm* — Patterson & Sheridan, LLP

(57) ABSTRACT

An electrostatic protection circuit includes a first power line and a second power line. The electrostatic protection circuit includes a trigger circuit connected between the first and second power lines and outputs a trigger signal in response to a fluctuation of a voltage difference between the first and second power lines. The electrostatic protection circuit further includes a shunt element that is controlled by the trigger signal, and includes a main current pathway connected between the first and second power lines. The electrostatic protection circuit further includes a control circuit that is connected between the first and second power lines and supplies a control signal for increasing the conductivity of the shunt element when the voltage difference between the first power line and the second power line exceeds a predetermined voltage.

20 Claims, 2 Drawing Sheets

(56) References Cited

U.S. PATENT DOCUMENTS

| | | | |
|---|---|---|---|
| 2012/0018778 A1* | 1/2012 | Chen et al. | H01L 27/06 257/173 |
| 2013/0027820 A1* | 1/2013 | Padilla et al. | H02H 9/04 361/56 |
| 2013/0342941 A1* | 12/2013 | Wang et al. | H02H 9/04 361/56 |
| 2014/0029144 A1 | 1/2014 | Kaku | |
| 2015/0124359 A1* | 5/2015 | Cao et al. | H02H 9/04 361/56 |
| 2016/0268798 A1* | 9/2016 | Haruki et al. | H02H 9/046 361/56 |

FOREIGN PATENT DOCUMENTS

| | | |
|---|---|---|
| JP | 2011-100907 A | 5/2011 |
| JP | 2014026996 A | 2/2014 |

* cited by examiner

ELECTROSTATIC PROTECTION CIRCUIT

CROSS-REFERENCE TO RELATED APPLICATION

This application is based upon and claims the benefit of priority from Japanese Patent Application No. 2015-046362, filed Mar. 9, 2015, the entire contents of which are incorporated herein by reference.

FIELD

Embodiments described herein relate generally to an electrostatic protection circuit.

BACKGROUND

Various proposals for a protection circuit against Electrostatic Discharge (ESD) have been made heretofore. ESD means a discharge from an electrically charged body or machine to a semiconductor device and a discharge from an electrically charged semiconductor device to the ground potential. When an ESD occurs in a semiconductor device, a large amount of electric charge from the terminal flows into the semiconductor device as a current and the electric charge generates a high voltage inside the semiconductor device, hence causing, for example, a dielectric breakdown of the internal elements and subsequently a fault in the semiconductor device.

A representative example of the electrostatic protection circuit is an RC triggered (RCT) MOS circuit. The RCT MOS circuit uses a trigger circuit comprising a serial circuit including a resistor and a capacitor serially connected between power terminals. A voltage at the connection point between the resistor and the capacitor is set as a trigger signal for driving a shunt transistor for discharging the electrostatic surge. By turning on the shunt transistor, a discharge current of an ESD surge flows in a power line and a high voltage may be applied to the internal circuit also connected to the power line. It is desirable to avoid breaking the internal circuit as a result of a high voltage being applied due to the discharge of the ESD surge.

DETAILED DESCRIPTION

According to at least one embodiment, an electrostatic protection circuit capable of preventing a breakdown of an internal circuit is provided.

In general, according to one embodiment, an electrostatic protection circuit includes a trigger circuit connected between a first power line and a second power line. The trigger circuit is configured to output a trigger signal in response to a fluctuation or change in a voltage difference between the first power line and the second power line, such as occurs when an electrostatic discharge is supplied to a device. A shunt element in the electrostatic protection circuit has a current pathway between the first power line and the second power line. A conductivity of the current pathway is controlled according to the trigger signal. For example, the resistance in the current pathway can be decreased when the voltage difference is at or above some level. A control circuit in the electrostatic protection circuit is connected between the first power line and the second power line. The control circuit is configured to supply a control signal to the shunt element for increasing the conductivity of the current pathway when the control circuit detects the voltage difference between the first power line and the second power line exceeds a predetermined voltage. In some embodiments, the predetermined voltage can be set according to the maximum rated voltage of an internal circuit for which the electrostatic protection circuit is intended to protect from ESD shocks.

An electrostatic protection circuit according to various embodiments will be hereinafter described in detail with respect to various drawings. The scope of the present disclosure is not limited to these example embodiments, but also includes variations, combinations, and modifications of the examples which would be apparent to those of ordinary skill in the art.

First Embodiment

Figure 1:
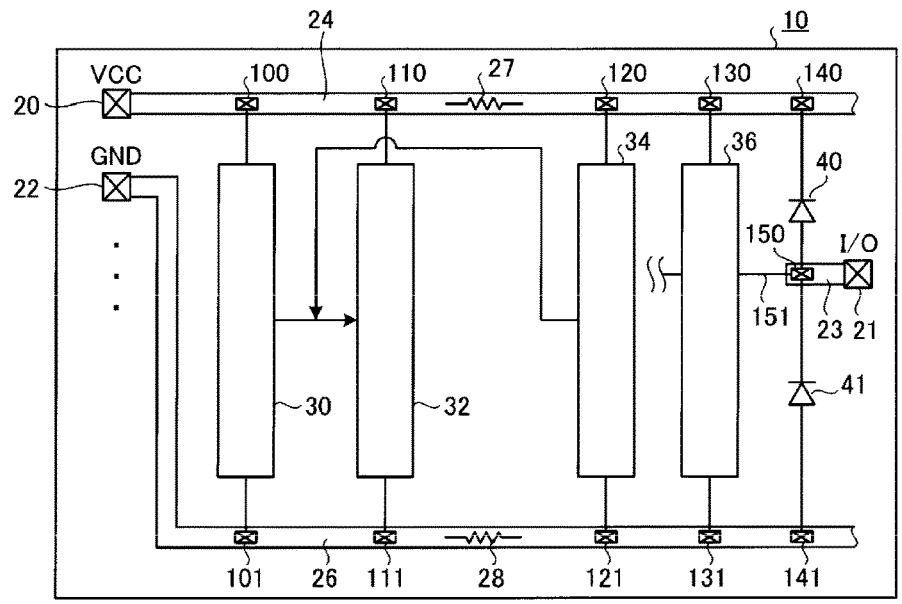
FIG. 1 depicts an electrostatic protection circuit according to a first embodiment.

FIG. 1 depicts an electrostatic protection circuit according to a first embodiment. The electrostatic protection circuit according to the first embodiment is provided in a semiconductor chip 10. The electrostatic protection circuit according to the first embodiment includes a first power line 24 connected to a first power terminal 20. For example, a power voltage VCC of a high potential side of a power supply or the like is applied to the first power terminal 20 in the normal state. The circuit further includes a second power line 26 connected to a second power terminal 22. For example, a ground potential VSS of a low potential side is applied to the second power terminal 22 in the normal state.

The electrostatic protection circuit according to the first embodiment includes a trigger circuit 30 that is connected to the first power line 24 at a contact portion 100 and is connected to the second power line 26 at a contact portion 101. The trigger circuit 30 is connected to the first power line 24 and the second power line 26 in the contact portion 100 and the contact portion 101, for example, through vias (not specifically illustrated) formed in an insulating film (not specifically illustrated) provided in the semiconductor chip 10. In this context, "vias" are conductive elements used to make layer-to-layer electrical connections. The first power line 24, the second power line 26, and a signal input/output line 23 are connected to other circuit elements in a similar manner. The trigger circuit 30 outputs a trigger signal in response to a voltage difference generated between the first power line 24 and the second power line 26.

The electrostatic protection circuit according to the embodiment includes a shunt circuit 32 connected between the first power line 24 and the second power line 26. The trigger signal from the trigger circuit 30 is supplied to the shunt circuit 32. The shunt circuit 32 includes, for example, a shunt element (not specifically illustrated) formed by a MOS transistor with a source-drain path, that is the main current path of the MOS transistor, connected between the first power line 24 and the second power line 26. The shunt circuit is connected to the first power line 24 at contact portion 110 and to the second power line 26 at contact portion 111.

The electrostatic protection circuit according to the first embodiment includes an overvoltage detection circuit 34 connected between the first power line 24 and the second power line 26. The overvoltage detection circuit 34 is connected to the first power line 24 at a contact portion 120 and is connected to the second power line 26 at a contact portion 121. When a voltage between the contact portion 120 of the first power line 24 and the contact portion 121 of the second power line 26 exceeds a predetermined threshold voltage, the overvoltage detection circuit 34 supplies a control signal to the shunt circuit 32. The control signal supplied by the overvoltage detection circuit 34 increases the current flowing in the shunt element of the shunt circuit 32 and reduces the shunt resistance value while enhancing the conductivity of the shunt element.

An internal circuit 36 is connected to the first power line 24 at a contact portion 130 and is connected to the second power line 26 at a contact portion 131.

The internal circuit 36 receives an input signal through the signal input/output line 23 connected to the input/output terminal 21 and a signal line 151, and outputs an output signal through the input/output terminal 21.

The cathode of an ESD protection diode 40 is connected to the first power line 24 at a contact portion 140, and the anode is connected to the signal input/output line 23 at a contact portion 150. Similarly, the cathode of an ESD protection diode 41 is connected to the signal input/output line 23 at the contact portion 150, and the anode is connected to the second power line 26 at a contact portion 141.

When a positive ESD surge with respect to the second power line 26 (e.g., ground potential) is applied to the first power line 24, the trigger circuit 30 supplies the trigger signal to the shunt circuit 32. In response to the trigger signal from the trigger circuit 30, the shunt circuit 32 is turned on (forms a conductive pathway between the first power line 24 and the second power line 26). According to this, a discharge path of the ESD surge is formed between the first power line 24 and the second power line 26. When a negative ESD surge with respect to the second power line 26 is applied to the first power line 24, a discharge path of the ESD surge is formed by the ESD protection diodes (40, 41).

When a positive ESD surge with respect to the second power line 26 is applied to the input/output terminal 21, the trigger circuit 30 connected between the first power line 24 and the second power line 26 responds and supplies the trigger signal to the shunt circuit 32. In response to the trigger signal, the shunt circuit 32 is turned on and a discharge path of the ESD surge is formed between the first power line 24 and the second power line 26.

By turning on the shunt circuit 32, a discharge current of the ESD surge flows in the first power line 24 and the second power line 26. According to this discharge current, a voltage drop occurs in the respective resistors (27, 28) (hereinafter, referred to as wiring resistors or wiring resistances) of the respective power lines (24, 26). The overvoltage detection circuit 34 is connected to the respective power lines (24, 26) at the contact portions (120, 121) closer to the input/output terminal 21 than the contact portions (110, 111) where the shunt circuit 32 is connected to the respective power lines (24, 26). According to this, a voltage rise amount caused by a voltage drop occurring in the wiring resistances (27, 28) due to the discharge current flowing in the power lines (24, 26) may be reflected in the detection voltage of the overvoltage detection circuit 34. The wiring resistances can be considered to be uniform over the entire lengths of the first power line 24 and the second power line 26; however, for convenience sake of the description, only the wiring resistance 27 between the contact portion 110 and the contact portion 120 and the wiring resistance 28 between the contact portion 111 and the contact portion 121 are specifically illustrated.

For example, a voltage drop generated in the wiring resistance 27 by the discharge current of the ESD surge discharged from the input/output terminal 21 through the shunt circuit 32 increases the voltage in the contact portions (130, 131) to which the internal circuit 36 is connected, as compared to the voltage in the contact portion 110 to which the shunt circuit 32 is connected. Similarly, since the voltage on the side of the overvoltage detection circuit 34 rises, an increase in the voltage applied to the internal circuit 36 by the shunt circuit 32 discharging the ESD surge may be detected by the overvoltage detection circuit 34. The overvoltage detection circuit 34 detects an overvoltage applied to the internal circuit 36 and the shunt circuit 32 is controlled to reduce the voltage between the first power line 24 and the second power line 26, hence to be able to avoid such a situation that an overvoltage is applied to the internal circuit 36. When the overvoltage detection circuit 34 detects a voltage exceeding the threshold value, the conductivity of the shunt element of the shunt circuit 32 is enhanced to increase the current flow and the resistance value of the shunt element is reduced to lower the voltage difference between the power lines (24, 26), hence to be able to lower the voltage applied to the internal circuit 36. As the result, the internal circuit 36 may be protected from the breakdown caused by the overvoltage.

According to the first embodiment, when the voltage between the first power line 24 and the second power line 26 exceeds a predetermined threshold voltage, a overvoltage detection circuit 34 outputs a control signal to increase the current amount flowing in the shunt element forming the shunt circuit 32, hence to reduce the resistance value of the shunt element that is connected between the first power line 24 and the second power line 26, and thus lower the voltage difference between the power lines (24, 26). As the result, the voltage applied to the internal circuit 36 may be lowered. According to this process, since the voltage applied to the internal circuit 36 may be lowered, it is possible to avoid a situation that an overvoltage is applied to the internal circuit 36 during discharge of an ESD surge.

Second Embodiment

Figure 2:
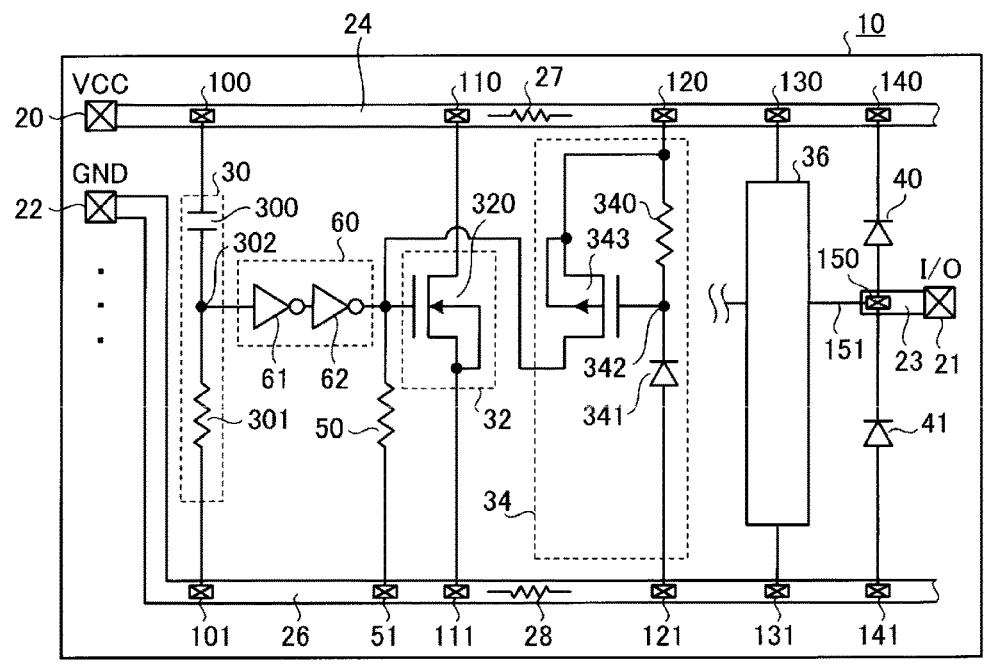
FIG. 2 depicts an electrostatic protection circuit according to a second embodiment.

FIG. 2 is a view illustrating an electrostatic protection circuit according to a second embodiment. In the electrostatic protection circuit according to the second embodiment, a trigger circuit 30 connected between the first power line 24 and the second power line 26 includes a CR series circuit including a capacitor 300 and a resistor 301 connected in series. A trigger signal is output from a common connection node 302 of the capacitor 300 and the resistor 301.

The trigger signal of the trigger circuit 30 is connected to a gate of an NMOS transistor 320 in the shunt circuit 32 through a buffer circuit 60. The buffer circuit 60 includes a two stage serial connection of inverters (61, 62) . The respective inverters (61, 62) are, for example, CMOS inverters. The trigger signal of the trigger circuit 30 is waveshaped and is amplified by the buffer circuit 60 to enhance driving ability of the signal ultimately supplied to the gate of the NMOS transistor 320. According to this structure, the current flow capacity of the NMOS transistor 320 may be increased. As the result, discharge ability with respect to the ESD surge may be enhanced.

The source of the NMOS transistor 320 is connected to the second power line 26 in the contact portion 111, and the drain is connected to the first power line 24 at the contact portion 110. One end of a resistor 50 is connected to the gate of the NMOS transistor 320 and the other end of the resistor 50 is connected to the second power line 26 at a contact portion 51. The resistor 50 is used in order to set a bias point of the gate of the NMOS transistor 320.

The overvoltage detection circuit 34 according to the second embodiment is connected to the first power line 24 at the contact portion 120 and is connected to the second power line 26 at the contact portion 121. The overvoltage detection circuit 34 includes a serial circuit of a resistor 340 and a diode 341 connected in series between first power line 24 and second power line 26. The cathode of the diode 341 is connected to one end of the resistor 340, and the anode is connected to the second power line 26. In short, the diode 341 is disposed to be reversely biased by the power voltage VCC supplied to the first power terminal 20 and the ground potential VSS applied to the second power terminal 22 in the normal state.

The overvoltage detection circuit 34 includes a PMOS transistor 343. The gate of the PMOS transistor 343 is connected to the common connection node 342 of the resistor 340 and the diode 341. The source of the PMOS transistor 343 is connected to the first power line 24 at the contact portion 120 and the drain is connected to the gate of the NMOS transistor 320.

When a positive ESD surge with respect to the second power line 26 is applied to the first power line 24, the trigger circuit 30 outputs a trigger signal. The trigger signal is supplied to the gate of the NMOS transistor 320 through the buffer circuit 60 to turn on the NMOS transistor 320. According to this process, a discharge path for the ESD surge is formed between the first power line 24 and the second power line 26. When a negative ESD surge with respect to the second power line 26 is applied to the first power line 24, a discharge path for the ESD surge through the ESD protection diodes (40, 41) is formed.

When a positive ESD surge with respect to the second power line 26 is applied to the input/output terminal 21, the trigger circuit 30, turns on the NMOS transistor 320 of the shunt circuit 32. As the result, a discharge path for the ESD surge is formed between the first power line 24 and the second power line 26. When the voltage between the contact portion 120 and the contact portion 121 exceeds the breakdown voltage of the diode 341 of the overvoltage detection circuit 34, the diode 341 is turned on. For example, when the voltage drop caused by the wiring resistance 27 of the first power line 24 is raised according to the increased discharge current due to the ESD surge and the voltage between the first power line 24 and the second power line 26 exceeds the breakdown voltage of the diode 341 in the overvoltage detection circuit 34, the diode 341 is turned on (forms a conductive pathway).

When the voltage drop generated in the resistor 340 by turning on the diode 341 exceeds the threshold voltage of the PMOS transistor 343, the PMOS transistor 343 is turned on. When the PMOS transistor 343 is turned on, the potential of the gate of the NMOS transistor 320 rises. According to this process, the drain current of the NMOS transistor 320 is increased, the resistance between the source and the drain of the NMOS transistor 320 is reduced and the voltage between the first power line 24 and the second power line 26 is reduced. In short, by the response of the overvoltage detection circuit 34, the voltage between the first power line 24 and the second power line 26 may be reduced, hence to avoid such a situation that the overvoltage is applied to the internal circuit 36.

The threshold voltage to which the overvoltage detection circuit 34 responds is set as a voltage lower than the withstand (breakdown) voltage of the internal circuit 36. This is to protect the internal circuit 36 from the breakdown due to the application of the overvoltage. For example, the threshold voltage may be set as a voltage lower than the absolute maximum rated voltage of the internal circuit 36.

In the second embodiment, the threshold value to which the overvoltage detection circuit 34 responds may be set according to the breakdown voltage of the diode 341 connected to the resistor 340. The resistor 50 connected between the gate of the NMOS transistor 320 and the second power line 26 serves to set the potential of the gate of the NMOS transistor 320 when the PMOS transistor 343 is turned on. In other words, when the PMOS transistor 343 is turned on, the voltage between the first power line 24 and the second power line 26 is divided by the on-resistance of the PMOS transistor 343 and the resistor 50 and applied to the gate of the NMOS transistor 320. Accordingly, by properly setting the value of the resistor 50, the bias point of the NMOS transistor 320 when turning on the PMOS transistor 343 may be adjusted. According to this, it is possible to achieve a bias so that an excessive current does not flow in the NMOS transistor 320. Here, the diode 341 may be formed by a Zener diode, for example.

Third Embodiment

Figure 3:
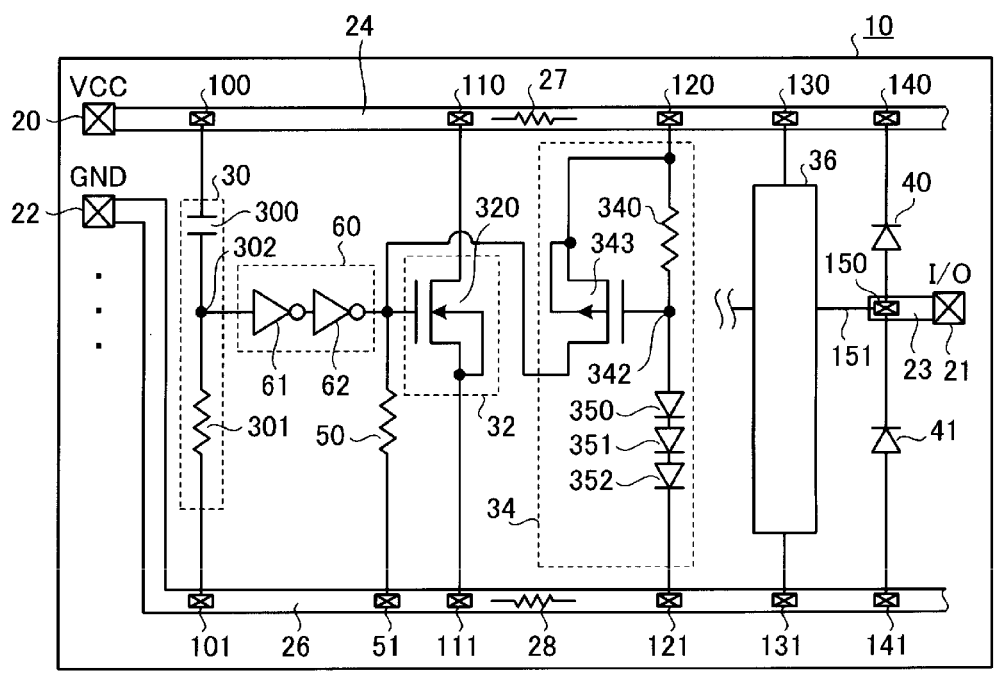
FIG. 3 depicts an electrostatic protection circuit according to a third embodiment.

FIG. 3 is a view illustrating an electrostatic protection circuit according to a third embodiment. In the electrostatic protection circuit according to the third embodiment, the overvoltage detection circuit 34 includes a serial circuit of a resistor 340 and three stages of diodes (350, 351, 352) connected between the first power line 24 and the second power line 26 in series. The three stages of the diodes (350, 351, 352) are connected in a forward bias state when the power voltage VCC is applied to the first power terminal 20 and the ground potential VSS is applied to the second power terminal 22 in the normal state.

In the third embodiment, for example, the three stages of the diodes (350, 351, 352) forming the overvoltage detection circuit 34 determine the threshold voltage for operating the overvoltage detection circuit 34. In other words, when the voltage between the first power line 24 and the second power line 26 gets higher than the summed threshold voltages of the three stages of the diodes (350, 351, 352), the three stages of the diodes (350, 351, 352) are turned on. When the voltage drop generated in the resistor 340 by turning on the three stages of the diodes (350, 351, 352) exceeds the threshold voltage of the PMOS transistor 343, the PMOS transistor 343 is turned on and the gate potential of the NMOS transistor 320 is raised. By raising the gate potential of the NMOS transistor 320, the conductivity of the NMOS transistor 320 enhanced, the drain current is thus controlled to be increased. According to this, the resistance between the source and the drain of the NMOS transistor 320 is reduced, the voltage between the first power line 24 and the second power line 26 is lowered, and the voltage applied to the internal circuit 36 is lowered. According to this process, it is possible to avoid such a situation that the overvoltage is applied to the internal circuit 36.

In the example embodiments, although the NMOS transistor 320 is used as the shunt element, a PMOS transistor may be used instead. In this case, the polarity of the biases of other elements is properly changed. Although the example embodiments have been described using a MOS transistor as the shunt element, a bipolar transistor may be used instead. In the case of using the bipolar transistor, the main current path is an emitter-collector path and the control electrode is a base electrode rather than a gate electrode. In this case, in relation to the bias, an NPN transistor may be used instead of the NMOS transistor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrostatic protection circuit, comprising:
   a trigger circuit connected between a first power line and a second power line and configured to output a trigger signal in response to a fluctuation in a voltage difference between the first power line and the second power line;
   a shunt element including a current pathway between the first power line and the second power line, a conductivity of the current pathway being controlled according to the trigger signal; and
   a control circuit connected between the first power line and the second power line and configured to supply a control signal to the shunt element for increasing the conductivity of the current pathway when the control circuit detects the voltage difference between the first power line and the second power line exceeds a predetermined voltage.

2. The electrostatic protection circuit according to claim 1, wherein the control circuit is further configured to supply the control signal to the shunt element so as to increase the conductivity of the current pathway in correspondence with increased voltage difference above the predetermined voltage.

3. The electrostatic protection circuit according to claim 1, further comprising:
   an internal circuit connected between the first power line and the second power line, the internal circuit being connected to the first power line at a first position and to the second power line at a second position, wherein
   the control circuit is connected to the first power line at a third position and to the second power line at a fourth position,
   the shunt element is connected to the first power line at a fifth position and to the second power line at a sixth position, and
   the third position is between the first and fifth positions along the first power line, and the fourth position is between the second and sixth positions along the second power line.

4. The electrostatic protection circuit according to claim 1, wherein the shunt element comprises a n-channel metal-oxide-semiconductor transistor.

5. The electrostatic protection circuit according to claim 1, wherein the shunt element comprises a bipolar junction transistor.

6. The electrostatic protection circuit according to claim 1, wherein the trigger circuit comprises a capacitor and resistor connected in series between the first and second power lines.

7. The electrostatic protection circuit according to claim 1, further comprising:
   a buffer circuit connected between the trigger circuit and the shunt element and configured to amplify the trigger signal and output the amplified trigger signal to the shunt element.

8. The electrostatic protection circuit according to claim 1, further comprising:
   an input/output signal line connected to an input/output terminal and an internal circuit connected between the first and second power lines;
   a first protection diode connected between the input/output signal line and the first power line; and
   a second protection diode connected between the input/output signal line and the second power line.

9. The electrostatic protection circuit according to claim 1, wherein
   the shunt element is an n-channel transistor,
   the control circuit includes a first diode and a first resistor connected in series between the first and second power lines, an anode of the first diode being connected to the second power line, a cathode of the first diode being connected to the first resistor,
   a p-channel transistor included in the control circuit has a control electrode connected to the cathode, a first end of the p-channel transistor being connected to first power line and the first resistor, a second end of the p-channel transistor being connected to a control electrode of the n-channel transistor, and
   a second resistor is connected between the control electrode of the n-channel transistor and the second power line.

10. The electrostatic protection circuit according to claim 9, wherein the first diode is a Zener diode.

11. The electrostatic protection circuit according to claim 1, wherein
    the shunt element is an n-channel transistor,
    the control circuit includes a first plurality of diodes and a first resistor connected in series between the first and second power lines, the first plurality of diodes being connected in series with each other anode to cathode, a cathode end of the first plurality of diodes being connected to the second power line, an anode end of the first plurality of diodes being connected to the first resistor,
    a p-channel transistor included in the control circuit has a control electrode connected to the anode end, a first end of the p-channel transistor being connected to first power line and the first resistor, a second end of the p-channel transistor being connected to a control electrode of the n-channel transistor, and
    a second resistor is connected between the control electrode of the n-channel transistor and the second power line.

12. An electrostatic protection circuit, comprising
    a trigger circuit connected between a first power line and a second power line and configured to output a trigger signal in response to a fluctuation in a voltage difference between the first power line and the second power line;
    a first metal-oxide-semiconductor (MOS) transistor having a gate to which the trigger signal is supplied, and a main current pathway that is connected between the first power line and the second power line; and
    a control circuit connected between the first power line and the second power line, wherein the control circuit includes:

a first resistor and a first diode that are connected in series between the first power line and the second power line, and a second metal-oxide-semiconductor (MOS) transistor having a gate connected to a connection node between the first resistor and the first diode, and a main current pathway connected between a first end of the first resistor and the gate of the first MOS transistor, the first end of the first resistor being connected to the first power line and a second end of the first resistor being connected to the connection node.

13. The electrostatic protection circuit according to claim 12, further comprising:
an internal circuit connected between the first power line and the second power line, the internal circuit being connected to the first power line at a first position and to the second power line at a second position, wherein
the first end of the first resistor is connected to the first power line at a third position and the first diode is connected to the second power line at a fourth position,
a first end of the main current pathway of the first MOS transistor is connected to the first power line at a fifth position and a second end of the main current pathway of the first MOS transistor is connected to the second power line at a sixth position, and
the third position is between the first and fifth positions along the first power line, and the fourth position is between the second and sixth positions along the second power line.

14. The electrostatic protection circuit according to claim 13, wherein a breakdown voltage of the first diode is less than or equal to a maximum rated voltage of the internal circuit.

15. The electrostatic protection circuit according to claim 12, further comprising:
a second resistor connected between the gate of the first MOS transistor and the second power line; and
a buffer circuit connected between the trigger circuit and the gate of the first MOS transistor, the buffer circuit configured to amplify the trigger signal output from the trigger circuit.

16. An electrostatic protection circuit, comprising:
a trigger circuit connected between a first power line and a second power line and configured to output a trigger signal in response to a fluctuation in a voltage difference between the first power line and the second power line;
a first metal-oxide-semiconductor (MOS) transistor having a gate to which the trigger signal is supplied, and a main current pathway that is connected between the first power line and the second power line; and
a control circuit connected between the first power line and the second power line, wherein the control circuit includes:

a first resistor and a first plurality of diodes connected in series between the first power line and the second power line, and a second metal-oxide-semiconductor (MOS) transistor having a gate connected to a connection node between the first resistor and the first plurality of diodes, the first plurality of diodes being connected in series with each other, anode to cathode, between the connection node and the second power line, a cathode end of the first plurality of diodes being connected to the second power line, an anode end of the first plurality of diodes being connected to connection node, and a main current pathway of second MOS transistor being connected between a first end of the first resistor and the gate of the first MOS transistor, the first end of the first resistor being connected to the first power line and a second end of the first resistor being connected to the connection node.

17. The electrostatic protection circuit according to claim 16, further comprising:
an internal circuit connected between the first power line and the second power line, the internal circuit being connected to the first power line at a first position and to the second power line at a second position, wherein
the first end of the first resistor is connected to the first power line at a third position and the cathode end of the first plurality of diodes is connected to the second power line at a fourth position,
a first end of the main current pathway of the first MOS transistor is connected to the first power line at a fifth position and a second end of the main current pathway of the first MOS transistor is connected to the second power line at a sixth position, and
the third position is between the first and fifth positions along the first power line, and the fourth position is between the second and sixth positions along the second power line.

18. The electrostatic protection circuit according to claim 17, wherein a summed threshold voltage of diodes in the first plurality of diodes is less than or equal to a maximum rated voltage of the internal circuit.

19. The electrostatic protection circuit according to claim 16, further comprising:
a second resistor connected between the gate of the first MOS transistor and the second power line; and
a buffer circuit connected between the trigger circuit and the gate of the first MOS transistor, the buffer circuit configured to amplify the trigger signal output from the trigger circuit.

20. The electrostatic protection circuit according to claim 16, wherein the first MOS transistor is a n-channel transistor and the second MOS transistor is a p-channel transistor.

* * * * *